United States Patent
Sambale

(10) Patent No.: US 11,497,057 B2
(45) Date of Patent: Nov. 8, 2022

(54) FIRST AND SECOND TERMINAL OF A RADIO NETWORK AND METHOD FOR OPERATING THE FIRST AND SECOND TERMINAL

(71) Applicant: Robert Bosch GmbH, Stuttgart (DE)

(72) Inventor: Klaus Sambale, Oberhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/045,155

(22) PCT Filed: Apr. 2, 2019

(86) PCT No.: PCT/EP2019/058253
§ 371 (c)(1),
(2) Date: Oct. 2, 2020

(87) PCT Pub. No.: WO2019/201585
PCT Pub. Date: Oct. 24, 2019

(65) Prior Publication Data
US 2021/0168863 A1    Jun. 3, 2021

(30) Foreign Application Priority Data

Apr. 17, 2018    (DE) .......................... 102018205779.6

(51) Int. Cl.
| | |
|---|---|
| *H04W 74/08* | (2009.01) |
| *H04L 1/18* | (2006.01) |
| *H04W 84/00* | (2009.01) |
| *H04W 4/40* | (2018.01) |

(52) U.S. Cl.
CPC ........ *H04W 74/0816* (2013.01); *H04L 1/188* (2013.01); *H04W 4/40* (2018.02); *H04W 84/005* (2013.01)

(58) Field of Classification Search
None
See application file for complete search history.

(56) References Cited

U.S. PATENT DOCUMENTS

| | | | |
|---|---|---|---|
| 2004/0071154 A1* | 4/2004 | Wentink | H04W 74/0808 370/395.21 |
| 2009/0122738 A1 | 5/2009 | Chen et al. | |
| 2011/0044172 A1* | 2/2011 | Yim | H04L 47/19 370/236 |

FOREIGN PATENT DOCUMENTS

EP    2288190 A1    2/2011

OTHER PUBLICATIONS

International Search Report for PCT/EP2019/058253, dated May 29, 2019.

(Continued)

*Primary Examiner* — German Viana Di Prisco
(74) *Attorney, Agent, or Firm* — Norton Rose Fulbright US LLP; Gerard Messina

(57) ABSTRACT

A first on-board terminal for radio communication in a radio network. The first on-board terminal is designed to retransmit first data via the radio channel after the expiration of a second time period, which begins after the end of the previous transmission of the first data, if the radio channel is not occupied after the expiration of a first time period.

7 Claims, 3 Drawing Sheets

(56) References Cited

OTHER PUBLICATIONS 802.11P-2010—IEEE Standard for Information Technology—Local and Metropolitan Area Networks—Specific Part 11: Wireless LAN Medium Access Control (MAC) and Physical Layer (PHY) Specifications Amendment 6: Wireless Access in Vehicular Environments.
ETSI EN 302 663 V1.2.0 (Nov. 2012).
ETSI TS 102 687 V1.1.1 (Jul. 2011).

* cited by examiner

FIRST AND SECOND TERMINAL OF A RADIO NETWORK AND METHOD FOR OPERATING THE FIRST AND SECOND TERMINAL

FIELD

The present invention relates to a first and second terminal of a wireless network and to a method for operating the first and second terminal.

BACKGROUND INFORMATION

According to a CSMA/CA protocol (Carrier Sense Multiple Access/Collision Avoidance), a radio channel is accessed only if the channel has been previously identified as free. This method is used, for example, for IEEE 802.11p, which relates to a vehicle-specific adaptation of IEEE 802.11.

SUMMARY

According to one first aspect of the present invention, a first on-board (i.e., vehicle-side) terminal is provided for radio communication in a radio network. In accordance with an example embodiment of the present invention, the first on-board terminal is designed to ascertain first data, to carry out a channel access procedure for a radio channel, to transmit the first data via the radio channel, to await a first time period after the end of the transmission of the first data, to check after the expiration of the first time period whether the radio channel is occupied, and to retransmit the first data after the expiration of a second time period that begins after the end of the previous transmission of the first data, if the radio channel is not occupied after the expiration of the first time period.

Thus, an absence of a follow-up communication after the expiration of the first time period by a second terminal is advantageously interpreted as the first data not having been correctly received. As a result, the channel access procedure that has already taken place is utilized to start a retransmission of the first data after the expiration of the second time period, which is longer than the first time period. This prevents a channel access procedure from being carried out again. In the event of a subsequent communication originating from the second terminal, a retransmission of the first data by the first terminal is omitted. As a result, the channel access procedure is prevented from being carried out again and the spectral efficiency is thereby enhanced.

In one advantageous specific embodiment of the present invention, the channel access procedure, before a channel access, which includes the transmission of the first data, checks whether the radio channel is free for the duration of a monitoring time period, decrements a randomly selected back-off number for each time slot of the radio channel identified as free, and then uses the first data for the first time if the back-off number reaches a threshold value of, for example, zero and the radio channel is free.

This CSMA-CA method (Carrier Sense Multiple Access/Collision Avoidance) prevents colliding channel accesses. By awaiting the first time period and subsequently checking whether the radio channel is free, the channel access procedure previously carried out is not carried out again before the first data is retransmitted.

In one advantageous specific embodiment of the present invention, the first time period (SIFS; PIFS) is a Short Interframe Space or a PCF Interframe Space.

The first time period is advantageously selected to be so short that no terminal other than the second terminal which, for the purpose of communication, follows the first terminal, is able to successfully arbitrate the radio channel.

In one advantageous specific embodiment of the present invention, the second time period (PIFS; DIFS) is a PCF Interframe Space or a DCF Interframe Space.

The second time period is advantageously selected to be so short that the first terminal is still able to establish an erroneous transmission of the first data and is able to retransmit the first data even before the successful radio channel access by another terminal.

One second aspect of the present invention relates to a method for operating a first on-board terminal of a radio network. In an example embodiment of the present invention, the method includes: ascertaining first data, carrying out a channel access procedure for a radio channel, transmitting the first data via the radio channel, awaiting a first time period after the end of the transmission of the first data, checking after the expiration of the first time period whether the radio channel is occupied, and retransmitting the first data after the expiration of a second time period, which begins after the end of the previous transmission of the first data via the radio channel if the radio channel is not occupied after the first time period.

One third aspect of the present invention relates to a second on-board (i.e., vehicle-side) terminal for radio communication in a radio network. In accordance with an example embodiment of the present invention, the second terminal is designed to ascertain an identifier, which identifies a first on-board terminal as a predecessor for a transmission of the second data, to receive first data via a radio channel from the first terminal that includes the identifier, to ascertain second data, to await a time period after the end of the receipt of the first data, and to transmit the second data via the radio channel when the time period is expired.

A channel access procedure is advantageously carried out once by the first terminal, the first data are transmitted and all subsequent transmissions of second data in the form of a packet train are managed advantageously without a further channel access procedure. The second data of the packet train originate in this case from a respective terminal. The further transmissions are all a function of the first successful channel access procedure. Accordingly, data from different terminals are transmitted with the aid of a single access procedure, whereby the latency for the data transmission for a multi-hop communication is drastically reduced. As a result, the spectral efficiency as a whole is improved.

The second data have two functions: on the one hand, they form an ACK for the reception of the first data so that the first terminal receives a confirmation of the reception of the first data by the second terminal. On the other hand, the second data contain pieces of information for the third terminal. One advantageous specific embodiment is characterized in that the second data are ascertained as a function of the first data.

One advantageous specific embodiment is characterized in that the time period is a Short Interframe Space or a PCF Interframe Space.

The time period is advantageously selected to be so short that no other terminal is able to successfully arbitrate the radio channel.

One advantageous specific embodiment is characterized in that the second terminal is designed to await a further time period after the end of the transmission of the second data, to check after the expiration of the further time period whether the radio channel is occupied, and to retransmit the second data via the radio channel after the expiration of an additional time period after the end of the previous transmission of the second data if the radio channel is not occupied after the expiration of the additional time period.

Thus, an absence of a follow-up communication by a third terminal after the expiration of the further time period is advantageously interpreted as the second data not having been correctly received. As a result, the channel access procedure that has already taken place is utilized by the first terminal to start a retransmission of the second data after the expiration of an additional time period. This prevents a channel access procedure from being carried out again. In the case of a follow-up communication originating from the third terminal, a retransmission of the second data by the second terminal is omitted. As a result, a channel access procedure is prevented from being carried out again and the spectral efficiency is thereby enhanced.

As a further result, all terminals in the established sequence are supplied with the necessary pieces of information. In the event of an error, the terminal in question is immediately able to initiate measures in order to ensure the operational safety of the vehicle (for example, an emergency braking or an adherence to a new minimal distance to the preceding vehicle).

One fourth aspect of the present invention relates to a method for operating a second on-board terminal of a radio network. In accordance with an example embodiment of the present invention, the method includes: ascertaining an identifier, which identifies a first on-board terminal as the predecessor for a transmission of second data, receiving first data via a radio channel from the first terminal that includes the identifier, ascertaining second data, awaiting a time period after the end of the reception of the first data, and transmitting the second data via the radio channel when the time period has expired.

BRIEF DESCRIPTION OF THE DRAWINGS

Additional features and advantages are derivable from the following description and from the figures.

DETAILED DESCRIPTION OF EXAMPLE EMBODIMENTS

Figure 1:
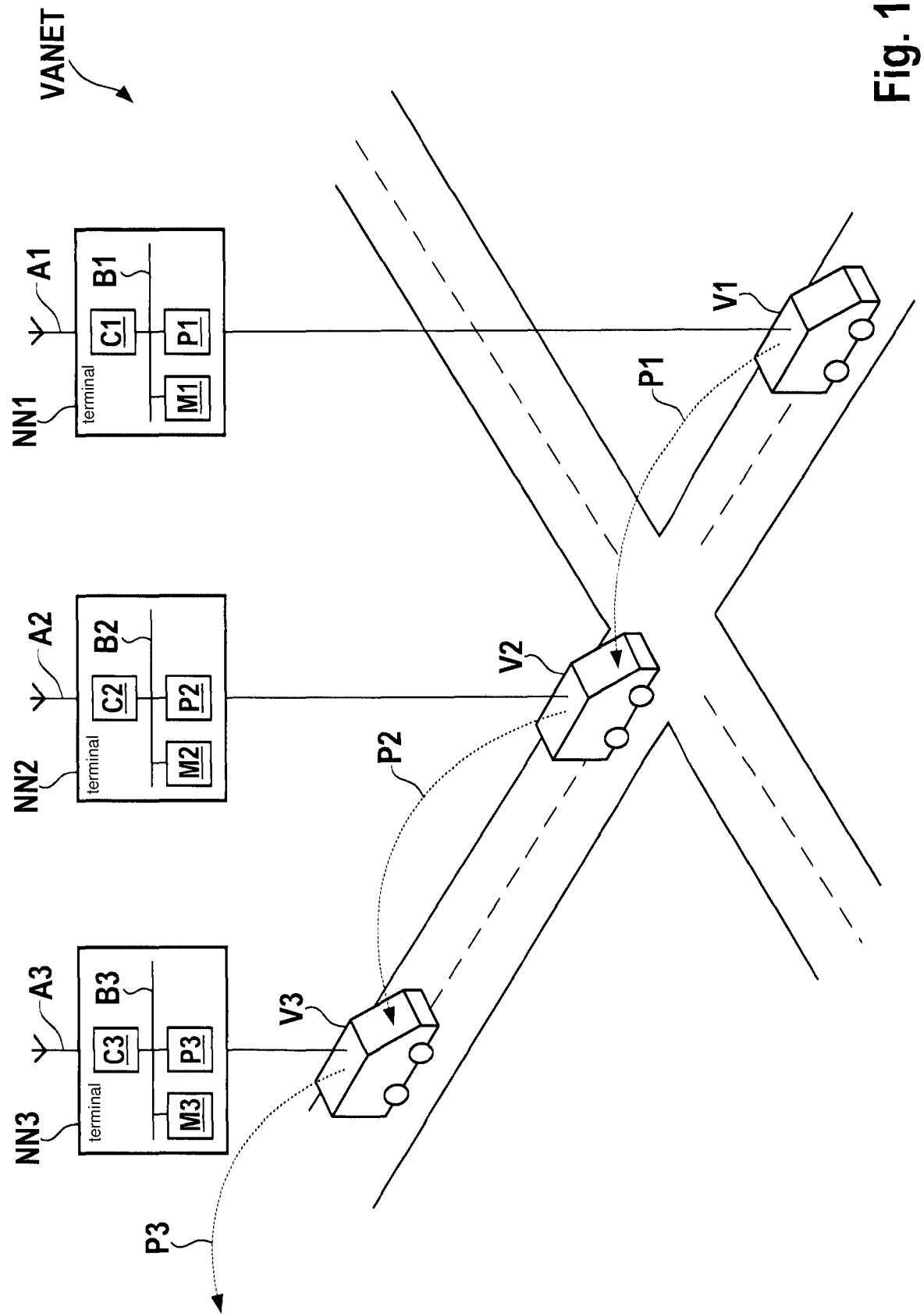
FIG. 1 schematically shows a perspective view of one exemplary traffic situation.

FIG. 1 schematically shows a perspective view of one exemplary traffic situation. Each vehicle V1, V2, V3 includes a terminal NN1, NN2, NN3, which collectively form an ad hoc radio communication network VANET. Other, in particular, stationary infrastructure units such as, for example, traffic lights may, of course, also include a terminal in the form of one of terminals NN1 through NN3.

Each of terminals NN1, NN2, NN3 includes a data bus B1, B2, B3, which interconnects at least one processor P1, P2, P3, one memory M1, M2, M3 and one radio module C1, C2, C3. At least one antenna A1, A2, A3 is connected to radio module C1, C2, C3. The respective radio module C1, C2, C3 is configured to transmit and receive radio signals according to the ad hoc radio communication network VANET via antenna A1, A2, A3. A computer program in the form of a computer program product is stored on memory M1, M2, M3. The computer program is designed to carry out the method steps described in this description, in particular, with the aid of the at least one processor P1, P2, P3 of the at least one memory M1, M2, M3 and at least one radio module C1, C2, C3, and to communicate with further terminals via the at least one antenna A1, A2, A2. Alternatively or in addition, processors P1, P2, P3 are implemented as an ASIC in order to carry out the method steps described.

In terms of radio resources, network VANET provides at least one ad hoc radio channel. Each of terminals NN1, NN2, NN3 is configured, for example, according to the Standard IEEE 802.11p, in particular, IEEE 802.11p-2010 of Jul. 15, 2010, which is incorporated by reference in this description. The IEEE 802.11p PHY and MAC functions provide services for protocols of the upper layer for dedicated short range communication, DSRC, in the U.S. and for cooperative ITS, C-ITS in Europe. Terminals NN1, NN2, NN3 communicate directly with one another in the non-licensed frequency range via the ad hoc radio channel. The ad hoc radio channel is accessed by radio modules C1, C2, C3 with the aid of a CSMA/CA protocol (Carrier Sense Multiple Access/Collision Avoidance). The ad hoc radio channel and the ad hoc radio communication network VANET are specified, for example, by the IEEE Standard "802.11p-2010—IEEE Standard for Information Technology—Local and Metropolitan Area Networks-Specifications Part 11: Wireless LAN Medium Access Control (MAC) and Physical Layer (PHY) Specifications Amendment 6: Wireless Access in Vehicular Environments," which is incorporated by reference. IEEE 802.11p is a standard for expanding the WLAN Standard IEEE 802.11. The aim of IEEE 802.11p is to establish radio technology in passenger cars and to provide a reliable interface for intelligent transport systems (ITS) applications. IEEE 802.11p is also the basis for Dedicated Short Range Communication (DSRC) in the 5.85 to 5.925 GHz range.

In order to access the ad hoc radio channel, terminals NN1, NN2 and NN3 apply a Listen-Before-Talk method. The LBT includes a back-off procedure, which checks the occupancy of the ad hoc radio channel before transmitting thereon. Terminal NN1, NN2, NN3 first listens to the radio channel and waits until the ad hoc radio channel AHCH is free after the expiration of a time period DIFS, which is referred to as an arbitration intermediate period. Ad hoc radio channel AHCH is classified as free if a power level is lower than a threshold level, and no ad hoc preamble is ascertained having a power level greater than a second threshold value. The ad hoc radio channel is occupied if the channel is identified as not free.

If the ad hoc radio channel is identified during time period DIFS as free, the back-off procedure begins. Terminal NN1, NN2, NN3 obtains a transmission opportunity TXOP when a back-off counter expires. If terminal NN1, NN2, NN3 identifies the ad hoc radio channel as free, it will transmit data, provided a TXOP duration of the transmission opportunity has not expired.

The document "ETSI EN 302 663 V1.2.0 (2012-11)," which is incorporated by reference herein, describes the two lowest layers of the ITS-G5 technology (ITS-G5: Intelligent Transport Systems, which operate in the 5 GHz frequency band), the physical layer and the data security layer. Radio modules C1, C2, C3 implement, for example, these two lowermost layers and corresponding functions according to "ETSI TS 102 687 V1.1.1 (2011-07)" in order to use the ad hoc radio channel. The following non-licensed frequency bands: 1) ITS-G5A for security-relevant applications in the frequency range 5.875 GHz to 5.905 GHz; 2) ITS-G5B for non-security-relevant applications in the frequency range 5.855 GHz to 5.875 GHz; and 3) ITS-G5D for the operation of ITS applications in the frequency range 5.055 GHz to 5.925 GHz, are available in Europe for utilizing the ad hoc radio channel, which is part of the non-licensed frequency band NLFB. ITS-G5 enables the communication between terminals NN1, NN2, NN3 outside the context of a base station. The Standard ITS-G5 enables the immediate exchange of data frames and avoids the effort required for the construction of a cell-based network.

The document "ETSI TS 102 687 V1.1.1 (2011-07)," which is incorporated by reference herein, describes for ITS-G5 a "Decentralized Congestion Control Mechanism." The ad hoc radio channel is used, among other things, for exchanging traffic safety data and traffic efficiency data. Radio modules C1, C2, C3 implement, for example, the functions as they are described in the document "ETSI TS 102 687 V1.1.1 (2011-07)." The applications and services of ITS-G5 are based on the cooperative behavior of the roadside terminals NN1, NN2, NN3, which form the ad hoc network VANET (Vanet: Vehicle Ad Hoc Network). The ad hoc network VANET enables time-critical applications in road traffic that require a rapid exchange of information in order to alert and to assist the driver and/or the vehicle in a timely manner. In order to ensure the smooth functioning of the ad hoc network VANET, "Decentral Congestion Control" (DCC) is used for the ad hoc radio channel of ITS-G5. DCC has functions situated on multiple layers of the ITS architecture. The DCC mechanisms are based on knowledge about the radio channel. The channel state information is obtained by channel probing. Pieces of channel state information may be obtained by the methods TPC (Transmission Power Control), TRC (Transmission Rate Control) and TDC (Transmission Data Rate Control). The methods determine the channel state information as a response to received signal level threshold values or pieces of preamble information of identified packets.

In the traffic situation shown, first vehicle V1 is driving ahead of second vehicle V2 and second vehicle V2 is driving ahead of third vehicle V3. In order to avoid rear-end collision accidents, for example, first vehicle V1 ascertains its instantaneously braking distance and transmits this to second vehicle V2 with the aid of first data P1. Second vehicle V2 adapts its distance to first vehicle V1 as a function of the received data P1. Second vehicle V2 ascertains its own braking distance as a function of the received first data P1, for example, as a function of the braking distance of vehicle V1, and transmits the ascertained braking distance to third vehicle V3 with the aid of data P2. Vehicle V3 ascertains similarly to vehicle V2 data P3 as a function of received data P2 and forwards its own braking distance to following vehicles with the aid of data P3.

In one further example, first vehicle V1 identifies an obstacle at a distance ahead and initiates a brake application. The pieces of information about the obstacle such as, for example, the position and/or the information that an emergency braking has been initiated, are transmitted to following vehicle V2 with the aid of data P1. Vehicle V2 forwards the pieces of information received with the aid of data P1 unchanged to third vehicle V3 with the aid of data P2.

Figure 2:
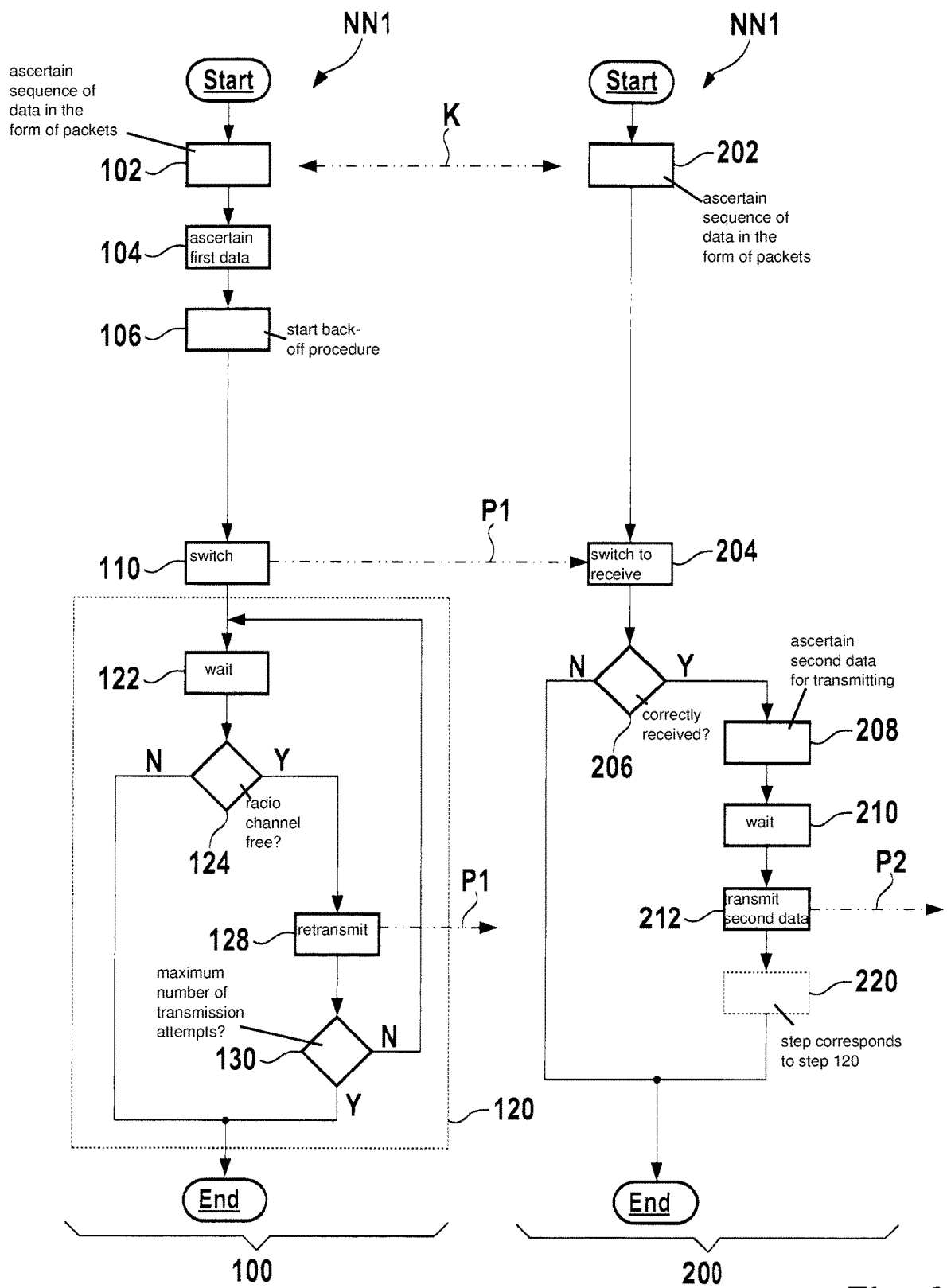
FIG. 2 schematically shows a flowchart in accordance with an example embodiment of the present invention.

FIG. 2 schematically shows a flowchart in accordance with an example embodiment of the present invention for operating first terminal NN1 and second terminal NN2 from FIG. 1. A sequence is provided in this case for operating first terminal NN1. A sequence 200 is provided for operating second terminal NN2 or further terminals.

First terminal NN1 and second terminal NN2 ascertain in a respective step 102 and 202 the sequence of data P1, P2 in the form of data packets to be transmitted. This sequence is permanently preconfigured, for example. In another example, however, a communication K takes place in advance in order to establish the sequence of the data transmission. For example, CAM messages or DENM messages, which indicate a position and driving direction of respective vehicle V1, V2 from FIG. 1 are exchanged by terminals NN1 and NN2. Thus, each vehicle V1, V2, V3 from FIG. 1 is able, for example, to establish by position and driving direction in which sequence vehicles V1, V2, V3 are driving in the driving direction. According to the driving sequence of vehicles V1, V2, V3, the sequence of the data to be transmitted is established, for example, in steps 102, 202 of respective terminal NN1, NN2. This sequence may take place in the driving direction or against the driving direction and is a function, for example, of the particular application. Thus, a temporal sequence against the driving direction is appropriate for a coordinated deceleration. In contrast, a temporal sequence against the driving direction may be appropriate for a coordinated start-up.

In a step 104, first data P1 are ascertained. In step 106 a back-off procedure is started and a time period DIFS is awaited. Terminal NN1 subsequently determines, in particular, according to a random principle, a value for a back-off number or a back-off counter. If, after a transmission of any terminal, the medium is identified as free for time period DIFS, a decrementing in each case by one of the back-off number per slot time period, which follows time period DIFS and for which the channel continues to be identified as free, is started. If the back-off number reaches the value zero and the channel is free, the terminal may access the radio channel. After the release of the radio channel access, a switch is made in a step 110 in order to transmit ascertained data P1 on the radio channel.

In one example, the radio channel used is a dedicated radio channel, which is reserved exclusively for transmitting consecutive packets according to a packet train. A packet train encompasses a number of data not immediately succeeding one another, which originate from different terminals and for which only the first of the participating terminals has carried out a channel access procedure. Alternatively or in addition, data P1, P2 include a flag that indicates this packet train communication. In a further example, the presence of a packet train communication is derived from the data received or to be transmitted.

Second terminal NN2 is switched in a step 204 to receive. If data P1 are successfully received in step 204, a switch is then made according to a step 206 into a step 208. In step 206, it is checked on the one hand whether first data P1 have been correctly received. It is also checked whether received data P1 originate from first terminal NN1. For this purpose, an identifier of first terminal NN1 is used, for example, which has been ascertained in step 202. This identifier identifies first terminal NN1 as the predecessor for the transmission of second data P2. This means that second terminal NN2 must initially receive first data P1 from first terminal NN1 in order to be allowed to transmit second data P2.

In step 208, second terminal NN2 ascertains second data P2 for transmitting. Second data P2 are ascertained, for example, as a function of received data P1. Alternatively, data P2 are not ascertained as a function of data P1. However, second data P2 are transmitted as a function of the reception of data P1.

In a step 210, a time period SIFS or PIFS after the end of the reception of first data P1 from step 204 is awaited. Once time period SIFS or PIFS has expired, the transmission of second data P2 is started in a step 212.

A step 220 following step 212 corresponds to a step 120, which is carried out by first terminal NN1. Step 120 follows in sequence 100 after step 110 and thus after the first transmission of first data P1 via the radio channel.

After the end of the transmission of first data P1, a first time period SIFS or PIFS according to a step 122 is awaited. After this first time period has expired, it is checked in a step 124 whether the radio channel is free in a monitoring period between an expiration of first time period SIFS or PIFS and the expiration of a second time period PIFS or DIFS, which begins after the end of the transmission of first data P1. If this is the case, first terminal NN1 starts in a step 128 to retransmit first data P1. In a step 130, it is checked whether the maximum number of transmission attempts is achieved. If so, the method is terminated. If this is not the case, a switch is made to step 122 in order, if necessary, to start a further transmission attempt.

Figure 3:
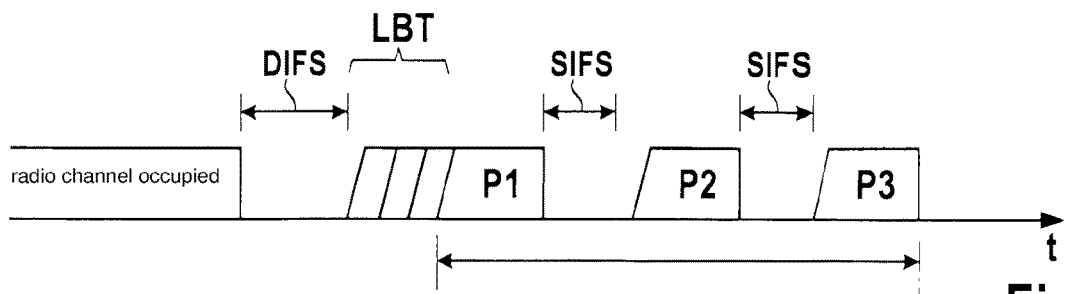
FIGS. 3 through 6 each schematically show a channel diagram in accordance with an example embodiment of the present invention.

FIG. 3 schematically shows a channel diagram. The transmission of first through third data P1 through P3 is shown, only first terminal NN1 awaiting time period DIFS in order to subsequently carry out once the procedure LBT (Listen-Before-Talk) according to steps 108 and 110 from FIG. 2. Thus, carrying out the procedure LBT once is sufficient for respective data P1, P2, P3 to be transmitted by a respective terminal NN1, NN2, NN3 from FIG. 1 via the radio channel, terminals NN2 and NN3 not having to carry out any respective LBT procedure for transmitting data P2 and P3.

Second terminal NN2 awaits time period SIFS after the end of the transmission of first data P1, in order to transmit second data P2 via the radio channel immediately after the end of time period SIFS. Third terminal NN3 proceeds analogously for transmitting third data P3.

Figure 4:
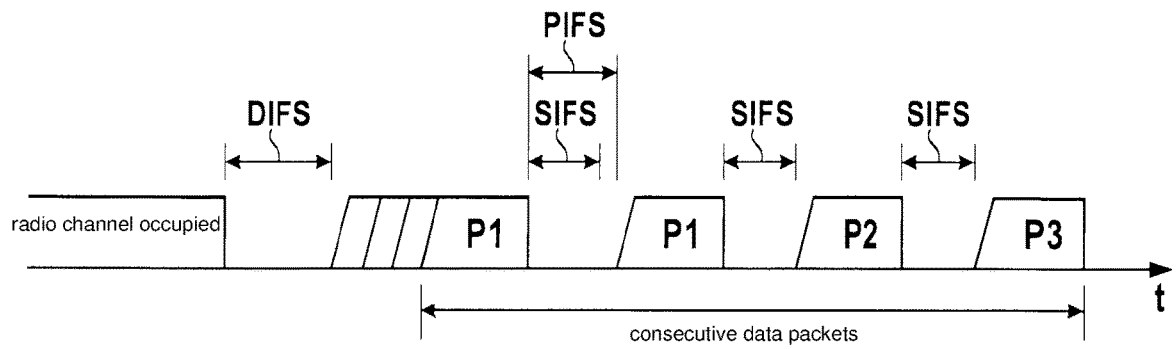

FIG. 4 schematically shows a channel diagram. In contrast to FIG. 3, a transmission of second data P2 after the end of time period SIFS, which begins at the end of the first transmission of first data P1, is omitted. This is established by first terminal NN1 in order to immediately begin retransmitting first data P1 after the end of time period PIFS, which begins at the end of the first transmission of first data P1. Following the retransmission of first data P1, second terminal NN2 begins to transmit second data P2 after the end of time period SIFS.

Figure 5:
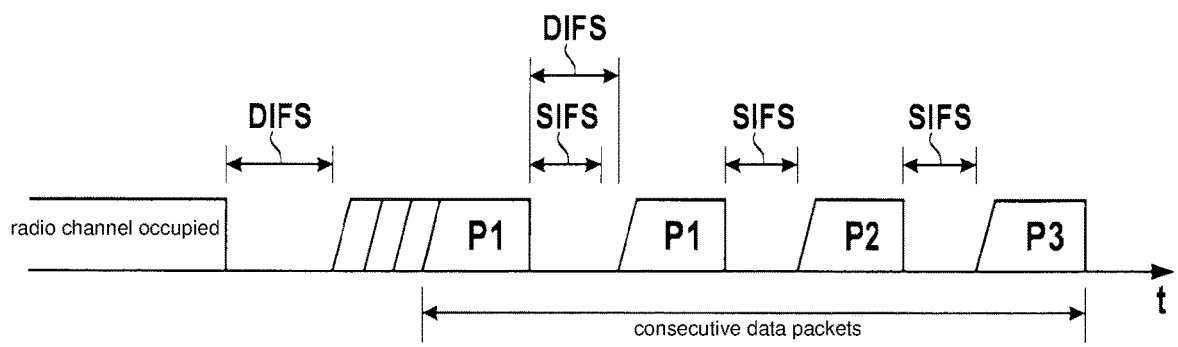

FIG. 5 schematically shows a channel diagram. In contrast to FIG. 4, time period DIFS is used instead of time period PIFS in order to begin retransmitting first data P1.

Figure 6:
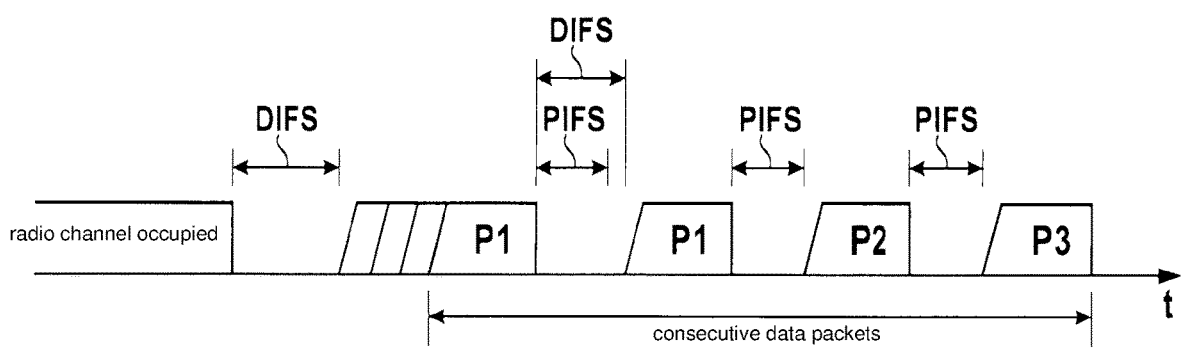

FIG. 6 schematically shows a channel diagram. In contrast to FIG. 5, time period PIFS is used instead of time period SIFS in order on the one hand to begin a respectively subsequent data transmission of data P2, P3 and, on the other hand, to check after the expiration of time period PIFS whether or not a subsequent data transmission by a terminal such as, for example, P2 takes place.

Time period SIFS is a Short Interframe Space. Time period PIFS is a PCF Interframe Space, PCF standing for Point Coordination Function. Time period DIFS is a DCF interframe space, DCF standing for Distribution Coordination Function.

What is claimed is:

1. A first on-board terminal for radio communication in a radio network, the first on-board terminal being configured to:

ascertain first data;
carry out a channel access procedure for a radio channel; transmit the first data via the radio channel;
await a first time period after an end of the transmission of the first data;
check, after expiration of the first time period, whether the radio channel is free; and
retransmit the first data via the radio channel after expiration of a second time period, which begins after the end of the previous transmission of the first data, based on the check ascertaining the radio channel is free after the expiration of the first time period;
wherein the radio channel is a dedicated radio channel which is reserved exclusively for transmitting, by a number of different terminals, consecutive packets according to a packet train, the packet train including a number of data not immediately succeeding one another, and which originate from the different terminals, and for which only a first of the different terminals has carried out the channel access procedure;
wherein at least three different terminals including the first on-board terminal, transmit data in the packet train on the dedicated radio channel.

2. The first on-board terminal as recited in claim 1, wherein the channel access procedure, before a channel access which includes the transmission of the first data, checks whether the radio channel is free for a duration of a monitoring time period, decrements a randomly selected back-off number for each time slot of the radio channel identified as free and transmits the first data for a first time when the back-off number reaches a threshold value and the radio channel is free.

3. The first on-board terminal as recited in claim 2, wherein the threshold value is zero.

4. The first on-board terminal as recited in claim 1, wherein the first time period is a Short Interframe Space or a Point Coordination Function Interframe Space.

5. The first on-board terminal as recited in claim 1, wherein the second time period is a PCF Interframe Space or a DCF Interframe Space.

6. The first on-board terminal as recited in claim 1, wherein the first on-board terminal is a terminal installed in a vehicle.

7. A method for operating a first on-board terminal of a radio network, the method comprising the following steps:

ascertaining first data;
carrying out a channel access procedure for a radio channel, transmitting the first data via the radio channel;
awaiting a first time period after an end of the transmission of the first data;
checking, after an expiration of the first time period, whether the radio channel is free; and
retransmitting the first data after expiration of a second time period, which begins after an end of the previous transmission of the first data, via the radio channel based on the checking ascertaining the radio channel is free after the expiration of the first time period;
wherein the radio channel is a dedicated radio channel which is reserved exclusively for transmitting, by a number of different terminals, consecutive packets according to a packet train, the packet train including a number of data not immediately succeeding one another, and which originate from the different terminals, and for which only a first of the different terminals has carried out the channel access procedure;

wherein at least three different terminals including the first on-board terminal, transmit data in the packet train on the dedicated radio channel.

\* \* \* \* \*